United States Patent [19]
Hollmann

[11] Patent Number: 5,589,940
[45] Date of Patent: Dec. 31, 1996

[54] APPARATUS FOR MEASURING THE CURVATURE OF A SURFACE USING MOVEABLE REFLECTING AND FOCUSING ELEMENTS

[75] Inventor: Joerg W. Hollmann, Midland, Canada

[73] Assignee: Hughes Electronics, Los Angeles, Calif.

[21] Appl. No.: 361,260

[22] Filed: Dec. 21, 1994

[51] Int. Cl.$^6$ ............................ G01B 11/24; G02B 7/04; G02B 27/40
[52] U.S. Cl. ............... 356/376; 250/201.4; 250/201.6; 250/201.2
[58] Field of Search ..................... 356/375, 376, 356/431; 250/201.2, 201.4, 201.6, 201.9, 559.39, 559.06, 559.38, 559.49

[56] References Cited

U.S. PATENT DOCUMENTS

| | | | |
|---|---|---|---|
| 4,102,577 | 7/1978 | Suzuki et al. | 356/376 |
| 4,118,127 | 11/1978 | Klein et al. | 250/559.49 |
| 4,158,507 | 6/1979 | Himmel | 356/376 |
| 4,204,772 | 5/1980 | Balasubramanian | 356/376 |
| 4,585,350 | 4/1986 | Pryor | 356/376 |
| 4,762,578 | 8/1988 | Burgin, Jr. et al. | 356/375 |
| 4,838,696 | 6/1989 | Pryor | 356/376 |
| 4,908,951 | 3/1990 | Gurny | 356/376 |
| 4,939,379 | 7/1990 | Horn | 356/376 |
| 5,251,156 | 11/1993 | Heier et al. | 356/376 |

Primary Examiner—Frank Gonzalez
Assistant Examiner—Jason D. Eisenberg
Attorney, Agent, or Firm—Michael W. Sales; Wanda K. Denson-Low

[57] ABSTRACT

A curvature measuring device (10) for measuring the curvature of an object (14) without contacting object (14) includes a moveable frame (20) and a reflector (28) for reflecting light incident thereupon. A reflector (28) is connected and rotatable with respect to moveable frame (20). An electro-optical device (42) is connected and moveable with respect to moveable frame (20). Electrooptical device (42) includes a light transceiver (52) for transmitting an incident beam of light (54) onto reflector (28) and for receiving a reflected beam of light (56) reflected by reflector (28). Electro-optical device (42) generates a focus signal related to a degree that reflected beam of light (56) is received by electro-optical device (42). A controller (90) calculates the curvature of object (14) by adjusting a position of moveable frame (20), an angular position of reflector (28), and focus position of electro-optical device (42). Light transceiver (42) can include a bifurcated fiber optic cable have a first bundle coupled to a light emitting diode and a second bundle coupled to a photodiode. The controller (90) aligns incident beam of light (54) to form a 90° angle with surface (12) of object (14). Controller (90) employs a focus signal generated by the electro-optical device (42) in a closed-loop fashion to adjust a frame positioning device (22), an angular positioning device (30), and a focus positioning device (40).

22 Claims, 2 Drawing Sheets

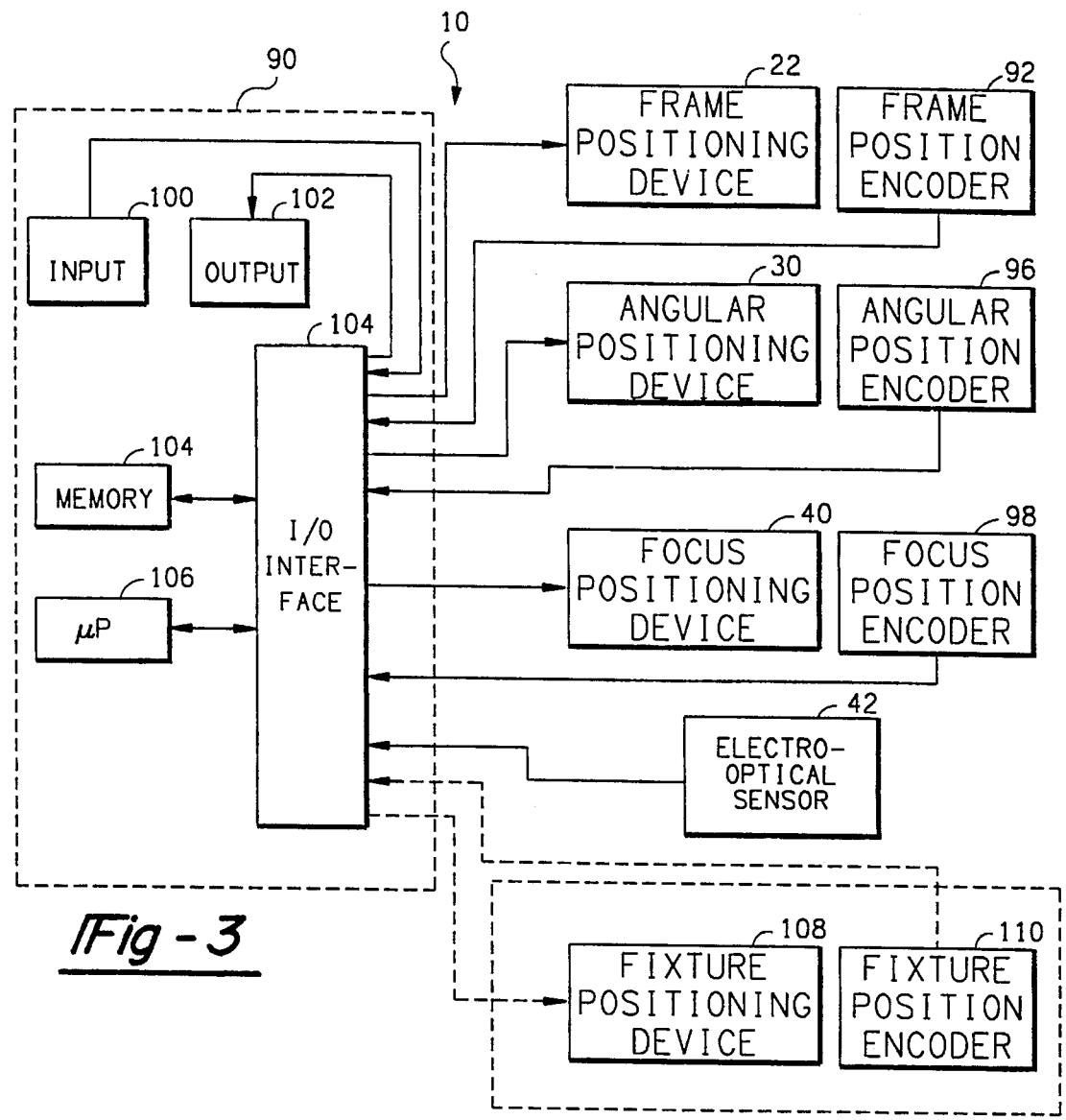
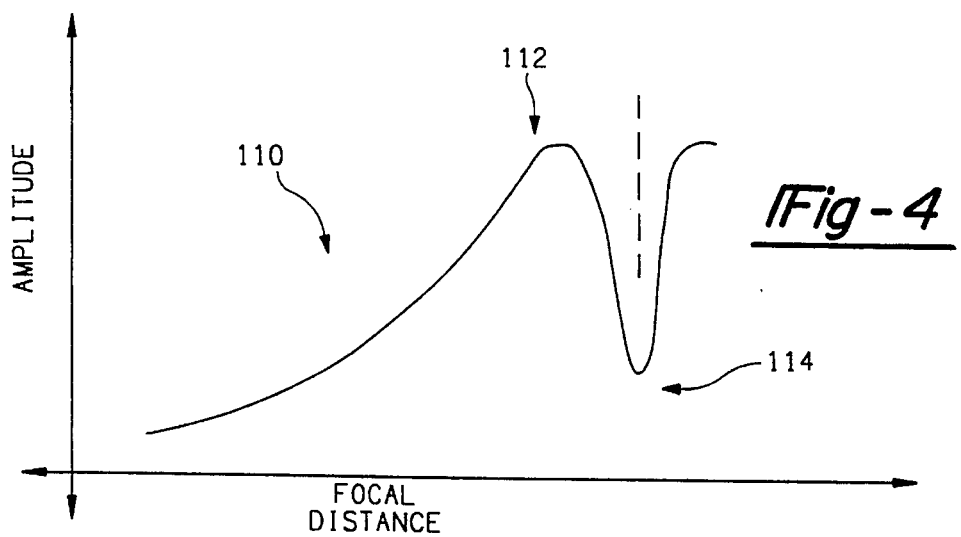

5,589,940

APPARATUS FOR MEASURING THE CURVATURE OF A SURFACE USING MOVEABLE REFLECTING AND FOCUSING ELEMENTS

BACKGROUND OF THE INVENTION

1. Technical Field

This invention relates to curvature measuring devices and, more particularly, to curvature measuring devices employing an electro-optical sensor for measuring the curvature of an object without contacting the object.

2. Discussion

Conventional curvature measuring devices typically measure objects having only one kind of curvature, such as circular parabolic, ellipsoidal, etc. Interferometric systems, for example, can only measure radii. Thus, if an object having a different kind of curvature is to be measured, more than one conventional curvature measuring device would be required.

Conventional curvature measuring devices typically also require contact with the object. However, when measuring the curvature of optical surfaces, this contact is highly undesirable since it can alter, damage, or destroy the optical surface.

Therefore, a curvature measuring device that can measure different kinds of curvature without contacting the object is desirable.

SUMMARY OF THE INVENTION

A curvature measuring device according to the present invention measures the curvature of an object without contacting the object and includes a moveable frame. A reflector reflects light incident thereupon and is connected and rotatable with respect to the moveable frame. A focusing device is connected and moveable with respect to the moveable frame. The focusing device includes a light transceiver for transmitting an incident beam of light onto the reflector and for receiving a reflected beam of light reflected by the reflector. The focusing device generates a focus signal related to a degree that the reflected beam is focused by the focusing device. A controller calculates the curvature of the object by adjusting a position of the moveable frame, an angular position of the reflector, and a focus position of the focusing device.

According to one feature of the invention, the light transceiver transmits the incident beam of light through at least one lens and receives the reflected beam of light through at least one lens.

According to another feature of the invention, the controller adjusts the angular position of the reflector and the focus position of the focusing device based on the focus signal. According to yet another feature of the invention, the controller includes a first positioning device for adjusting the position of the moveable frame, a second positioning device for adjusting the angular position of the reflector, and a third positioning device for adjusting the focus position of the focusing device. The first positioning device includes a first encoder for generating a frame position signal related to the position of the moveable frame. The second positioning device includes a second encoder for generating an angular position signal related to the angular position of the reflector. The third positioning device includes a third encoder for generating a focus position signal related to the focus position of the focusing device.

Still other objects, features and advantages will be readily apparent.

BRIEF DESCRIPTION OF THE DRAWINGS

The various advantages of the present invention will become apparent to those skilled in the art after studying the following specification and by reference to the drawings in which:

FIG. 3 is an electrical schematic block diagram of the noncontact curvature measuring device of FIG. 1; and FIG. 4 illustrates the signal output of an electro-optical sensor of FIGS. 1 and 2 as a function of amplitude and focal distance.

DETAILED DESCRIPTION

Figure 1:
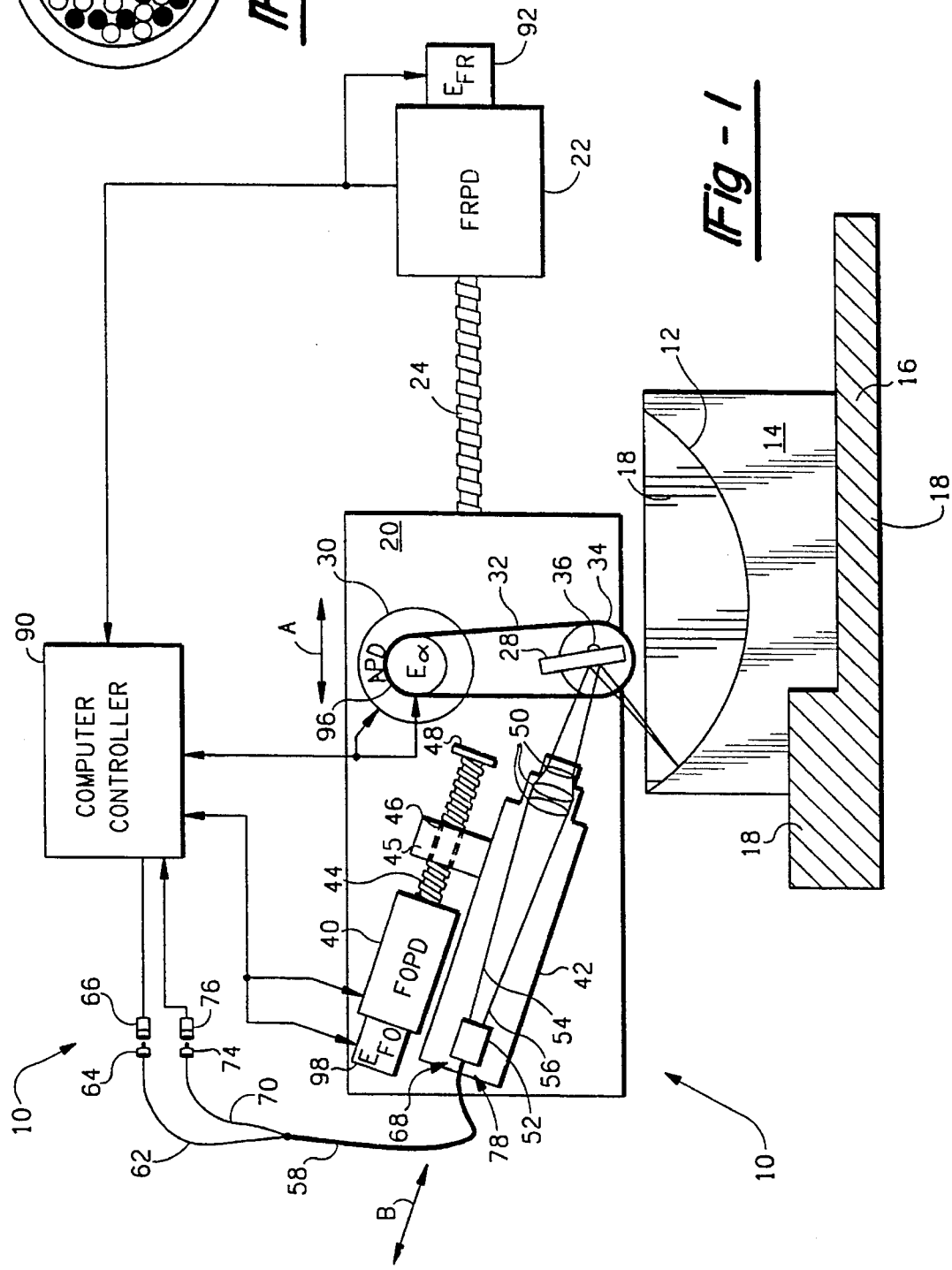
FIG. 1 is functional block diagram of a noncontact curvature measuring device according to the present invention.

A noncontact curvature measuring device according to the invention includes a computer controller which adjusts the position of a frame, a reflecting mirror, and a focus position of an electro-optical sensor. The computer controller employs a focus signal generated by the electro-optical sensor to align the angle of incidence of an incident beam of light with respect to the curved surface to be measured to 90°. Multiple encoders are employed to generate position signals for the frame, the angular position of the reflector, and the focus position of the electro-optical sensor. These signals are used to calculate the curvature of the object. The computer controller scans the object with the reflecting mirror using a range of approximately 0° to 90°. For more conclusive testing, the object can be rotated. In FIG. 1, noncontact curvature measuring device 10 for measuring the curvature of a surface 12 of an object 14 is illustrated. Object 14 is preferably accurately positioned by a fixture 16 including one or more aligning surfaces 18. A "V"-shaped groove 19 for accurately positioning test object 14 may also be defined by aligning surfaces 18.

Noncontact curvature measuring device 10 further includes a frame 20 connected to a frame positioning device 22. In a preferred embodiment, the frame positioning device (FRPD) 22 is a precision direct current (DC) motor which rotates a threaded shaft 24 to adjust the position of frame 20 in a direction indicated by arrow "A". Skilled artisans can appreciate that other suitable frame positioning devices can be employed instead of the DC motor and threaded shaft.

Noncontact curvature measuring device 10 further includes a reflecting mirror 28 rotatably mounted to frame 20. Angular positioning device (APD) 30 adjusts the angular position of reflecting mirror 28 relative to frame 20. For example, APD 30 can be a precision DC motor connected by an endless belt 32 to a cylindrical disk 34 rotatably mounted on a precision bearing 36. To improve measuring accuracy the precision bearing can include a sapphire bearing for "play-free" rotation. Endless belt 32 can be a steel belt. Skilled artisans can appreciate that other suitable angular positioning devices 30 can be employed.

Noncontact curvature measuring device 10 further includes a focus positioning device (FPD) 40 mounted to frame 20. FPD 40 adjusts the position of an electro-optical sensor 42 in a direction indicated by arrow "B" relative to frame 20. FPD 40 can also be a precision DC motor which rotates a threaded shaft 44. Electro-optical sensor 42 can include a mounting flange 45 with a mating threaded bore 46 for receiving threaded shaft 44. A stop surface 48 may also be provided. Skilled artisans can appreciate that other suitable focus positioning devices can be employed.

Figure 2:
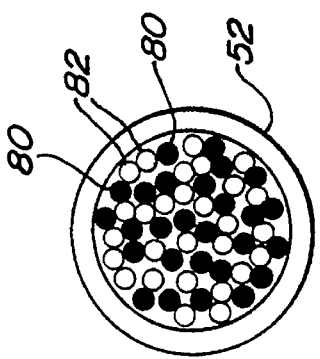
FIG. 2 illustrates an end view of the light transceiver of FIG. 1.

Electro-optical sensor 42 includes at least one lens 50 for focusing incident and reflected beams of light. A light transceiver 52 transmits an incident beam of light 54 and receives a reflected beam of light 56. Light transceiver 52 includes a bifurcated fiber optic bundle 58 having a first fiber optic bundle 62 with one end 64 coupled to a light emitting diode (LED) 66 and opposite end 68 disposed inside electro-optical sensor 42. Bifurcated fiber optic bundle 58 includes a second fiber optic bundle 70 having one end 74 coupled to a photodiode 76 and an opposite end 78 disposed inside electro-optical sensor 42 adjacent opposite end 68 of first fiber optic bundle 62. Referring to FIG. 2, an end view of light transceiver 52 shown which illustrates bifurcated randomly mixed fiber optic bundle 62 adjacent end 68 are randomly mixed with fibers 82 of second fiber optic bundle 70 adjacent end 78.

Noncontact curvature measuring device 10 further includes a computer controller 90 connected to frame positioning device 22, angular positioning device 30, focus positioning device 40, light emitting diode 66 and photodiode 76. A frame position encoder ($E_{FR}$) 92 provides a frame position signal related to the position of the frame and is coupled to computer controller 90. An angular position encoder ($E_\alpha$) 96 generates an angular position signal related to the angular position of reflecting mirror 28 and is coupled to computer controller 90. A focus position encoder ($E_{FO}$) 98 generates a focus position signal related to the focus position of electro-optical sensor 42 relative to frame 20.

FIG. 3 illustrates an electrical schematic block diagram of noncontact curvature measuring device 10. Computer controller 90 preferably includes an input 100, such as a keyboard, and an output 102, such as a display, a printer, etc., coupled to an input/output (I/O) interface 104. Computer controller 90 further includes memory 104 for storing a suitable operating program and a microprocessor 106 for executing the operating program. Frame positioning device 22, frame position encoder 92, angular positioning device 30, angular position encoder 96, focus position device 40, focus position encoder 98 and electro-optical sensor 42 are connected via I/O interface 104 to microprocessor (MP) 106 and memory 104. A fixture positioning device (FIPD) 108 and a fixture position encoder (EFt) 110 can also be provided to adjust the position of fixture 16.

In use, computer controller 90 generates a frame positioning signal which is output to the frame positioning device 22. Frame position encoder 92 generates a frame position signal related the position of frame 20. Computer controller 90 enables LED 66 which generates an incident beam of light which is transmitted by first fiber optic bundle 62. Incident beam of light 54 is directed through lens 50 onto reflecting mirror 28. Reflecting mirror 28 reflects incident beam of light 54 onto surface 12 of test object 14. A reflected beam of light 56 is directed by surface 12 of object 14 onto reflecting mirror 28 which reflects the reflected beam of light onto lens 50. Lens 50 focuses reflected beam of light 56. Second fiber optic bundle 70 transmits the reflected beam of light 56 to photodiode 76 which generates a focus signal related to a degree that electro-optical sensor 42 focuses the reflected beam of light 56.

Computer controller 90 aligns the angle of incidence of incident beam of light 54 onto surface 12 of object 14 to 90°. Computer controller 90 scans surface 12 with incident beam of light 52 by rotating reflecting mirror 28 in the range of approximately 0° to 90°. After aligning reflecting mirror 28, computer controller 90 aligns electro-optical sensor 42. As can be appreciated, computer controller could perform alignments of reflecting mirror 28 and electro-optical sensor 42 simultaneously.

Referring to FIG. 4, focus signal 110 is illustrated. After adjusting the position of frame 20 using frame positioning device 22, computer controller 90 adjust the angular position of reflecting mirror 28 using angular positioning device 30 until a peak 112 is located. Angular position encoder 96 generates an angular position signal related to the angular position of reflecting mirror 28 relative to frame 20. When computer controller 90 locates peak 112, computer controller 90 adjusts the position of the electro-optical sensor 42 to focus the incident beam of light more accurately. More particularly, computer controller 90 adjusts focus positioning device 40 until the focus signal corresponds to a focus peak 114.

Subsequently computer controller 90 adjusts the position of frame 20 using frame positioning device 22 and repeats the above-described process. Computer controller 90 aligns the angle of incidence defined by an angle between the incident beam of light 54 and surface 12 of object 14 to 90°. Computer controller 90 then calculates the curvature of object 14 using the accumulated frame position signals, the angular signals, the focus position signals, and the focus signal.

As can be appreciated, noncontact curvature measuring device 10 is versatile since it can measure different kinds of curvature. Noncontact curvature measure device 10 can also employed with sensitive optical surfaces. Noncontact curvature measuring device 10 is also lower cost than interferometric systems which can only measure radii. Furthermore, noncontact curvature measuring device 10 decreases the long measurement times associated with other conventional curvature measuring devices. The various advantages of the present invention will become apparent to those skilled in the art after a study of the foregoing specification and following claims.

What is claimed is:

1. Apparatus for measuring the curvature of a surface of an object at a first position on the surface comprising:

a frame;

means for moving said frame relative to said object to provide a frame position signal;

light source means for providing incident light;

means disposed adjacent to said light source means for focussing said incident light said focussing means including means for transmitting light onto said reflecting means and means for receiving return light from said reflecting means and for transmitting return light to said light source means to provide a focus signal;

means disposed adjacent to said focussing means for reflecting said incident light onto said surface and for reflecting return light from said surface to said focussing means;

means for rotating said reflecting means to provide an angle position signal for the reflecting means;

means for moving said focussing means to provide a focus position signal; and control means including a processor means for receiving said frame position signal, said angle position signal, said focus position signal, and said focus signal to calculate the curvature of said surface at said first position.

2. The apparatus of claim 1 said control means further comprising means for generating control signals for causing movement of at least one of said rotating means and said focussing means prior to the calculation of curvature at the position.

3. The apparatus of claim 2 wherein said means for transmitting light and said means for receiving and transmitting return reflected light comprise a single fiber optic bundle coupled between said control means and said reflecting means.

4. The apparatus of claim 1, said control means further comprising means for generating control signals for causing a series of movements of said frame moving means to calculate curvature for an entire surface.

5. The apparatus of claim 1 further comprising a fixture for receiving said object and means for moving said fixture relative to said reflecting means.

6. The apparatus of claim 1 wherein said light source means comprises a light emitting diode controlled by said control means.

7. The apparatus of claim 1 wherein said focussing means comprises at least one lens.

8. The apparatus of claim 1 wherein said reflecting means is rotated such that incident light is reflected onto said surface at a plurality of angles of incidence with respect to said surface.

9. The apparatus of claim 8 wherein at least one of said angles of incidence is 90°.

10. The apparatus of claim 1 wherein said control means uses a peak in said focus signal to control the movement of at least one of said focussing means and said rotating means.

11. The apparatus of claim 1, said apparatus being disposed in noncontact physical relationship with respect to the surface of said object.

12. Method for measuring the curvature of a surface of an object at a first position on the surface comprising:

providing a frame;

moving said frame relative to said object to provide a frame position signal;

providing incident light;

providing reflecting means;

reflecting said incident light onto said surface and receiving return light reflected by said surface using said reflecting means;

moving said reflecting means to provide an angle position signal for the reflecting mechanism;

providing focussing means;

focussing light onto said reflecting means using said focussing means, said focussing step including transmitting light onto said reflecting means and receiving and transmitting return reflected light to provide a focus signal;

moving said focussing means to provide a focus position signal; and processing said frame position signal, said angle position signal, said focus position signal, and said focus signal to calculate the curvature of said surface at said first position.

13. The method of claim 12 further comprising the step of generating control signals to cause at lease one of said rotating steps and said focussing steps to occur prior to the calculation of curvature at the position.

14. The method of claim 13 wherein said steps of transmitting light and receiving and transmitting return reflected light include using a single fiber optic bundle.

15. The method of claim 12, further comprising the step of generating control signals to cause a series of movements of said frame moving means to calculate curvature for the entire said surface.

16. The method of claim 12 further comprising the steps of providing a fixture for receiving said object and moving said fixture relative to said reflecting means.

17. The method of claim 12 wherein said step of providing a light source comprises providing a light emitting diode controlled by said control means.

18. The method of claim 12 wherein said focussing steps includes using at least one leans.

19. The method of claim 12 further comprising moving said reflecting means such that incident light is reflected onto said surface at a plurality of angles of incidence with respect to said surface.

20. The method of claim 19 wherein at least one of said angles of incidence is 90°.

21. The method of claim 12 said processing step using a peak in said focus signal to control at lease one of said focussing steps and rotating steps.

22. The method of claim 12 said apparatus being disposed in noncontact physical relationship with respect to the surface of said object.

* * * * *